Aug. 3, 1926. 1,594,702
D. B. WILLIAMS
PROCESS AND APPARATUS FOR EXTRACTING AND SEPARATING NUT
MEATS FROM THEIR SHELLS
Filed Oct. 6, 1924 4 Sheets-Sheet 1
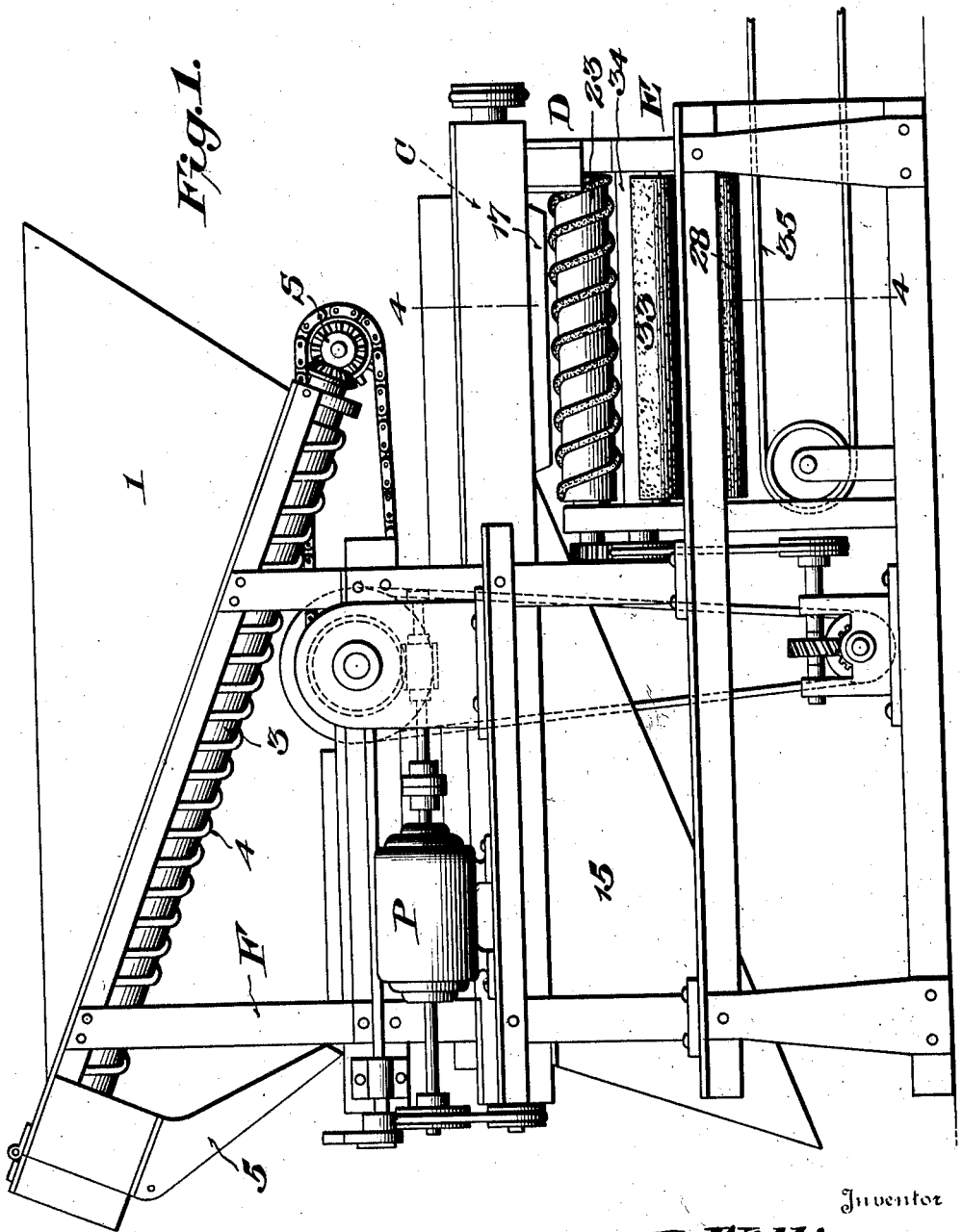
Inventor
Dick B. Williams,

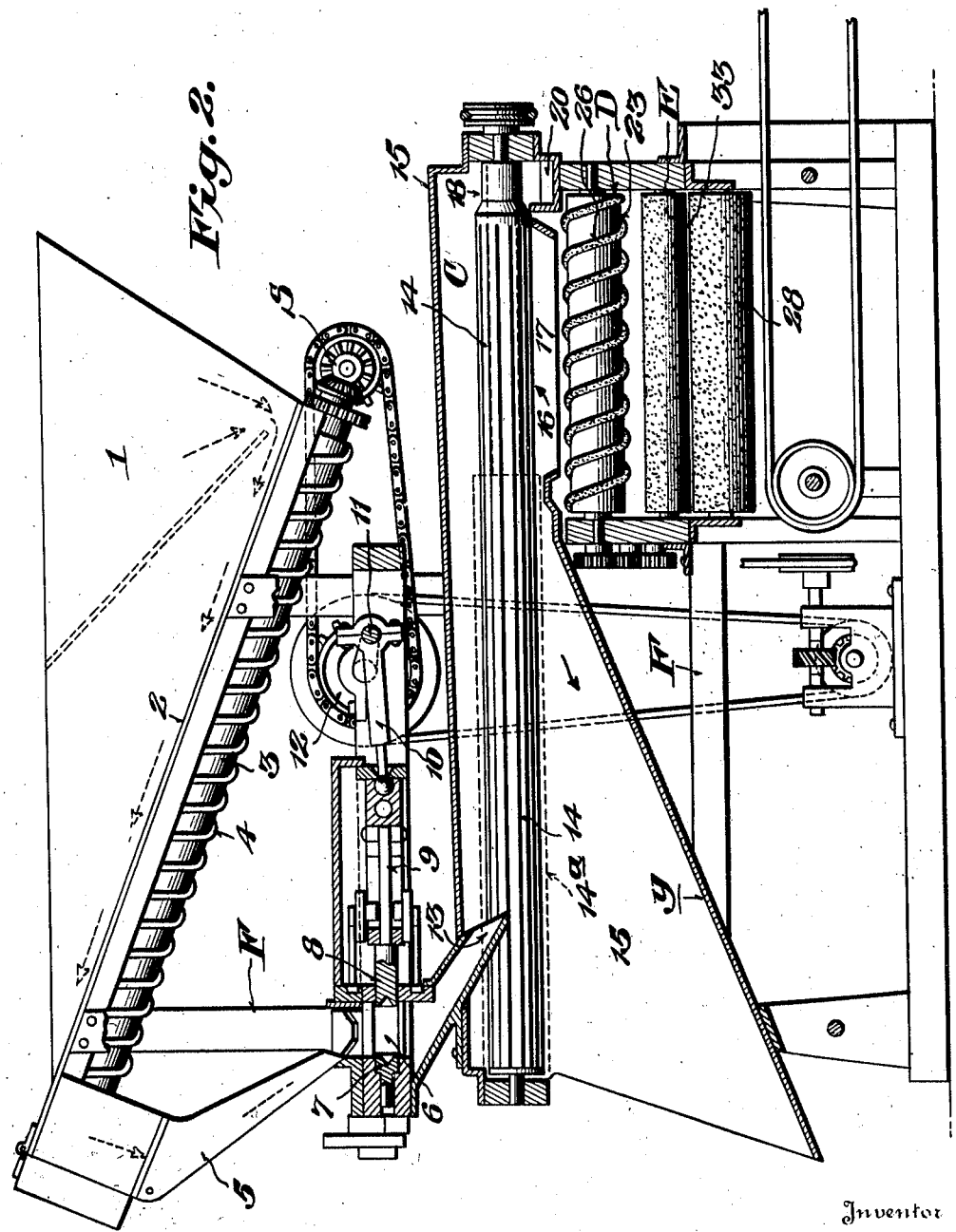

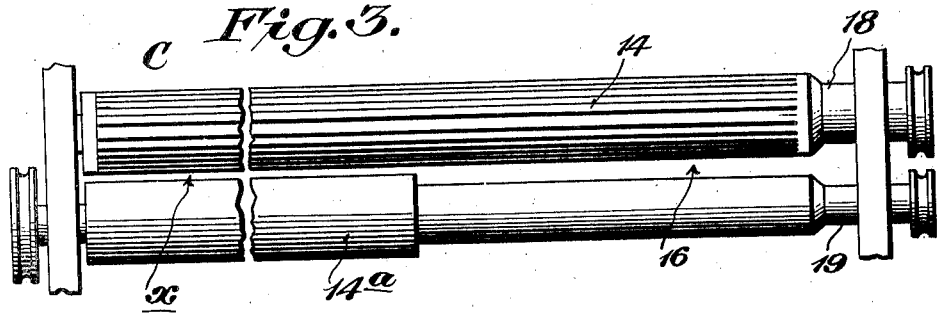
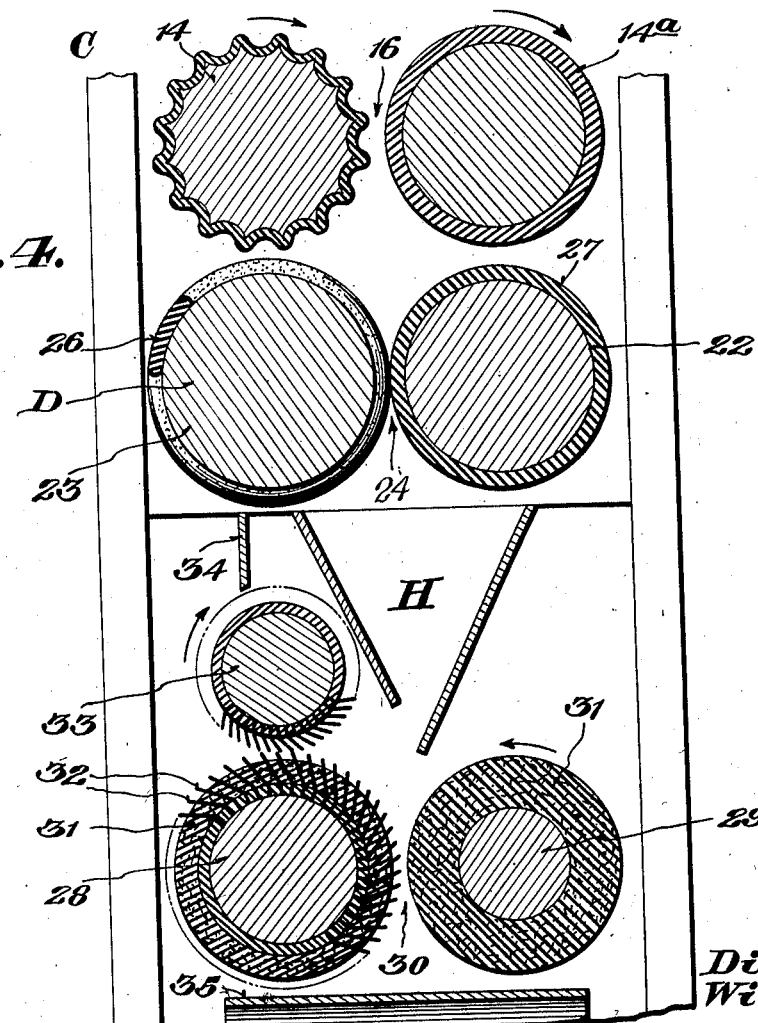

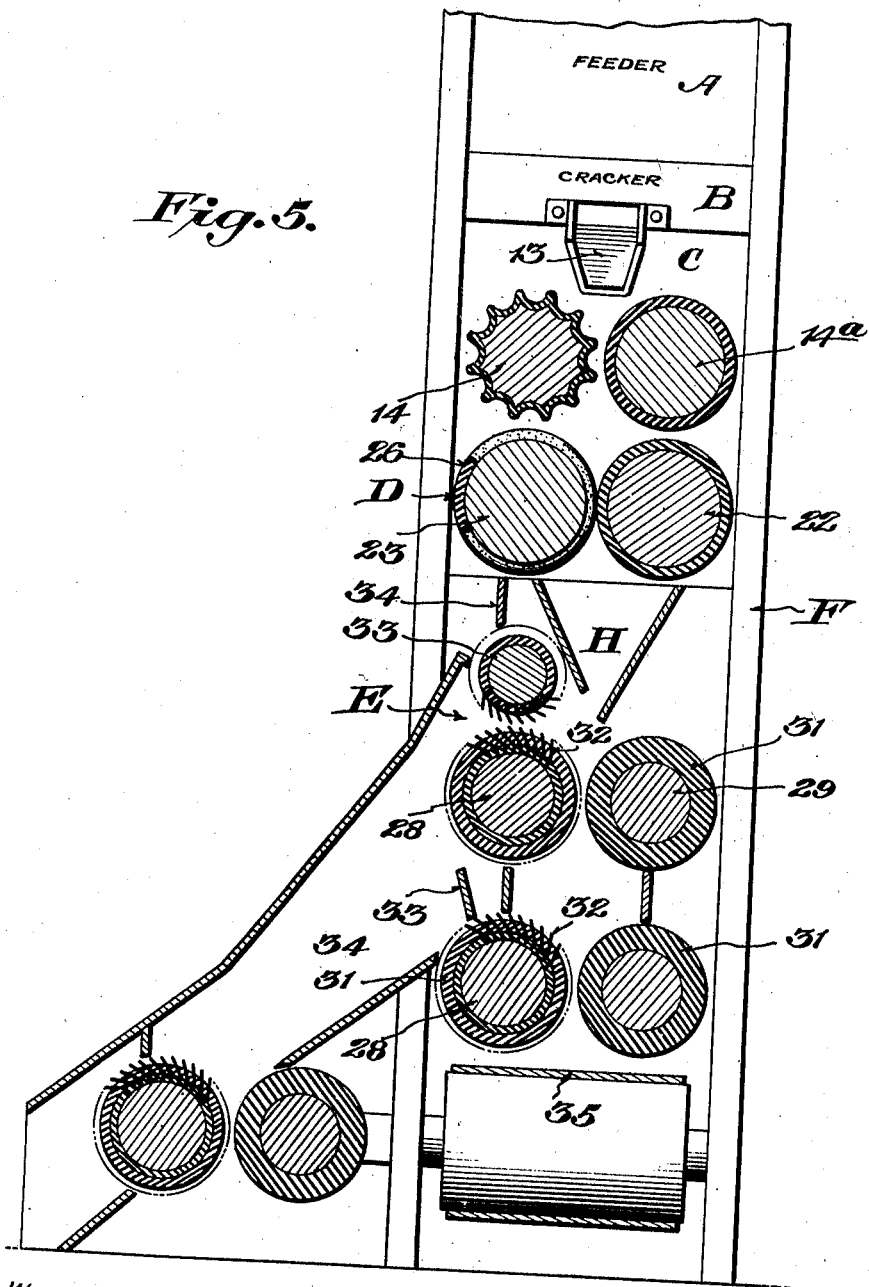

Patented Aug. 3, 1926.

1,594,702

UNITED STATES PATENT OFFICE.

DICK B. WILLIAMS, OF CHICAGO, ILLINOIS, ASSIGNOR TO ROBERT E. WOODSON, OF ST. LOUIS, MISSOURI.

PROCESS AND APPARATUS FOR EXTRACTING AND SEPARATING NUT MEATS FROM THEIR SHELLS.

Application filed October 6, 1924. Serial No. 742,003.

This invention relates to certain improvements in the art of extracting and separating nut meats from their shells.

Primarily the invention contemplates a continuous process which facilitates and perfects the modus operandi of cracking a shelled nut such as a pecan with a minimum injury to its meat and subsequently shelling the cracked nuts and separating the meats from the shell particles in a manner that will insure a maximum recovery of the meats with a large percentage of substantially perfect nut meat halves resulting from the operation. To that end the invention provides a practical solution of the difficult problem of successfully and economically cracking, shelling and separating the loosened meats by mechanical means, and the manner in which that is done admits of the use of a consolidation of instrumentalities which provide for mechanically cracking, shelling and separating the product at a great reduction of time and labor as compared with the hand methods extensively in vogue, and at the same time eliminating the undesirable and unsanitary features associated with the hand methods of shelling cracked nuts and recovering the loosened meats.

Accordingly, the present invention includes the various stages or steps first of cracking the nuts in single file fashion to insure a uniform cracking action for every nut, followed by the shelling step which effects the detachment of the meat portions from the shell particles, leaving them in detached form, but in one mass, and subsequently separating the loosened or recovered meats from the shell particles in order to effect a complete isolation of the detached portions, one from the other. These several operations are so coordinated according to the present invention as to provide great capacity for the apparatus, while at the same time insuring a thorough and efficient mechanical handling of the parts of the nut at every point in the process, whereby speed and efficiency is maintained, great economies effected and thorough sanitation insured, besides effecting the recovery of a large percentage of substantially perfect nut meat halves.

With these and other objects in view which will be apparent to those familiar with this art as the nature of the invention is better understood, the same consists in the novel construction, combination and arrangement of parts hereinafter more fully described, illustrated and claimed.

The invention is necessarily susceptible of a wide range of modification in the specific character of instrumentalities employed in carrying out the improved process, but for illustrative purposes there is shown in the drawings a practical arrangement of the invention, in which drawings:

Figure 1 is a side elevation of the improved apparatus for extracting and separating nut meats from their shells.

Fig. 2 is a vertical sectional view showing more clearly the construction and relation of the several units of the apparatus.

Fig. 3 is a detail plan view of the segregating distributing unit for the de-shelled nuts, that is, acting to reject unshelled nuts and to segregate therefrom the loosened meats and shelled particles which are to be delivered to the separating unit for the final separation of nut particles from the nut meats.

Fig. 4 is a vertical sectional view of the shelling and separating units on the line 4—4 of Fig. 1.

Fig. 5 is a diagrammatic view showing the several steps or stages of the process from the nut cracking station to the separating unit which effects the final recovery of the meats from the shell particles.

Like references designate corresponding parts throughout the several figures of the drawings.

In carrying forward the invention there are five principal stages or steps involved in the improved process of extracting and separating nut meats from their shells, namely, the feeding of nuts singly to a cracking unit, discharging the cracked nuts to a shelling unit to effect a de-shelling action, that is, releasing of the nut meats from the clinging particles of shell, then segregating the shelled nuts and meats from the unshelled or rejected nuts and distributing the shelled nuts and meats to a separating unit which provides for final separation of the nut meats from shell particles and delivering the meats to a proper receptacle therefor. This process contemplates a continuous and automatic way of handling masses of uncracked nuts, particularly pecans, segregating the uncracked nuts from the mass, cracking them one by one and automatically delivering them in sequence to the shelling device which removes the shells from the meats, after which still in sequence the shells and meats are automatically delivered or distributed to a device where the meats and shell particles are separated and delivered to different points of deposit. All of this is done in a manner to produce a minimum of broken meats, and the proper function of the various units is made possible because of the fact that each nut or portions thereof are subjected to individual action as opposed to operating on the nuts in bulk form. A machine adapted in a single unit to crack several nuts at one time would not produce whole meats, particularly with pecans, because of the fact that in the pecan nut there is a close adherence of the meat to the shell, and the delicate nature of the meat requires individual handling or treatment throughout the machine in order to effect the thorough extraction and separation of the meat from the sheet without substantial injury to the meat. Furthermore, any aggregation or bulk of cracked nuts delivered in a mass to the shelling unit would result in broken meats from the congestion that would produce frictional contact between the meats and shells, and likewise any bulk of shells and meats presented en masse to the separating unit would result in a loss of a certain proportion of meats by reason, under such conditions, of the same being encased or covered by shell particles which would prevent the meats being properly impaled upon the wires of the picking roll. It is this continuous sequence in the treatment of nuts singly as opposed to processes which treat the nuts in bulk that is a distinguishing feature of the present invention and is in itself a new contribution to the art.

For the purpose of carrying out this process various forms of construction may be used in building the several units which are coordinated to accomplish the desired result, but for illustrative purposes there is shown in the drawings of this application a combination of coordinated instrumentalities which have been found entirely practical and satisfactory for the intended purpose. Referring to these drawings the several operating units which successively act upon the nuts are designated generally by the reference letters A, B, C, D and E. The unit A is the feeding unit of the machine and operates to deliver the nuts singly to the cracking zone of the cracking unit B. Referring more particularly to these units it will be observed that the same occupy the top part or superstructure of the apparatus, the same being mounted in suitable frame-work designated generally by the letter F, and the feeding unit A essentially consists of a supply hopper 1 provided with an inlined bottom portion 2 within which are arranged a pair of oppositely rotating and upwardly inclined feeding rolls 3 provided thereon with uniform spiral feeding flights 4 providing pockets or spaces between the convolutions thereof which serve to receive and carry the individual nuts. These rolls are driven by means of a suitable drive designated generally by the reference letter S and the lower ends of said rolls are adapted to be covered by the mass of nuts in the deep end of the hopper, while the pitch or the incline of said rolls is such that nuts in excess of the capacity of the pockets formed between the flights on the rolls, will cause the excess nuts to fall back by gravity into the supply hopper thereby providing a feeding means for advancing nuts in single order toward the upper or high end of the hopper at which point is located a delivery chute 5 which is arranged to direct the nuts singly into the cracking space or zone 6 of the nut cracking unit B. This nut cracking space or zone 6 of the said unit lies between the relatively fixed and movable cracking heads 7 and 8, the movable cracking head being reciprocated by a suitable connection 9 with the operating pitman 10 which connects with a crank or equivalent element 11 on the nut cracking actuator, designated generally by the reference number 12 which includes a shaft, wheel and suitable sprocket or equivalent drive. The reciprocation of the movable cracking head in opposing relation to the fixed cracking head 7 of the cracking unit provides for exerting an endwise pressure on the nut, serving to fracture the shell in a manner that will not crush or injure the meat. The cracked nut is discharged from the space or zone 6 into a delivery chute 13 which serves to feed the cracked nut into the receiving end portion of the shelling unit C.

The purpose of the shelling unit, as already stated, is to provide mechanical means for releasing the nut meats from the clinging particles of shell and to do that in a way to obtain a maximum de-shelling action without injury to the meats, at the same time releasing from the shells a large percentage of substantially perfect nut meat halves. At the same time the shelling unit is so constructed, in one or more units according to the capacity required, as to not only effectually de-shell the larger percentage of the shelled nuts delivered thereto but also to operate to reject or eject for re-cracking purposes any improperly cracked nuts or those which have not been de-shelled by the action of the shelling container.

While various forms of construction may be advantageously resorted to for the shelling unit C a practical type of shelling unit is shown in the drawings as being substantially of the type disclosed in my former Patent No. 1,317,342, granted Sept. 13, 1919. The distinctive feature of this type of shelling unit is a pair of spaced parallel sheller rolls 14 and 14ᵃ having suitable drive connections with the power unit P of the machine each of which is provided with peripheral cushioning coverings, one of which is preferably of longitudinal ribbed rubber or equivalent cushioning material and constituting primary means for jarring or picking loose the shell particles of the meats from the previously cracked nuts. These sheller rolls 14 and 14ᵃ cooperate with the surrounding casing 15 in a manner similar to that described in the patent aforesaid, and provided means whereby the shell particles are thoroughly loosened from the meats and are delivered through the discharge space or interval 16 between the said two rolls into a discharge chute 17 which in turn feeds the shellings consisting of the shell particles and extracted meats to a shellings distributor herein referred to as the distributing unit D. The term shellings apply to the shell particles and the loosened meats which are desired to be recovered.

Unshelled or rejected nuts are carried along the rolls 14 and 14ᵃ to the terminal point where the roll extremities may be reduced as at 18 and 19 respectively providing a larger discharge space through which said unshelled or rejected nuts may be discharged into a return chute 20 for return to the cracking unit if the condition of the same justifies retreatment. Shell dust and trash from the cracking unit fall through the primary relatively narrow venting slot *x* between the rolls into a waste chute *y*.

The distributing unit D consists of a pair of horizontal spaced smooth surface rolls, one of which, 23, is provided with a spiral feed flight 26 of a width equal to the space 24 between the rolls. These rolls rotate outwardly in opposite directions at a comparatively slow speed their function being to distribute or spread, by the medium of the spiral flight, the shellings which pass between them to the rolls of the separating unit E, where the last stage of the process takes place. The separating unit may consist of one or more pairs of nut meat isolating members 28 and 29, advantageously located so as to provide means for completely isolating the nut meats from the shell particles and directing the two products to entirely different points of deposit. The construction and relation of the two isolating members 28 and 29 of the separating unit are important features of the invention. Various forms of construction, for this part of the invention, may be resorted to so long as the principle of operation involved is retained.

Accordingly, for illustrative purposes a practical embodiment of the two isolating members is shown in the drawings wherein said members may consist of a pair of rotating rollers arranged side by side and sufficiently spaced apart to provide therebetween a discharge space or passage 30 for both the shells and meat particles. A distinctive feature in the construction of the said members or rollers 28 and 29 is that of providing the same with sponge rubber or equivalent relatively thick resilient cushion bodies, and the member or roller 28 in addition to the sponge rubber or equivalent cushion body 31 is provided with card teeth or spines 32 which are preferably set tangentially to the axis of rotation of the roller 28 and the points of which project slightly beyond the peripheral surface of the soft cushion body 31 on the roller 28. The distance between the two rollers 28 and 29 at the discharge space or passage 30 is sufficiently small so as to compel the two rollers as they rotate, to draw in between them the meats and shell particles delivered from the hopper H thereabove with the result that the nut meats will become impaled on the points of the card teeth or spines 32, the sponge rubber or cushion body 31 of the roller 28 yielding sufficiently to permit the thorough impalement of the meats on the teeth or spines. At the same time the resilient cushion bodies of both of the rollers will yield so that the shell particles temporarily will become embedded in the bodies 31 until the moving surfaces of the rollers pass below the horizontal plane of the axes thereof, whereupon the elasticity of the cushion bodies 31 reasserts itself and causes the latter to spring back to normal contour with the result of forcibly throwing off the shell particles which may then drop to a suitable receptacle.

The nut meats remain impaled on the teeth or spines 32 until they are carried around to a suitable point where a stripping device 33 is located. The stripping device may consist of a fast rotating card wheel which is arranged sufficiently close to the spined periphery of the roller 28 to have a brushing action for sweeping off the nut meats impaled thereon, and a stripper blade 34 or equivalent device may be arranged adjacent to the stripper roll 33 to remove therefrom any clinging meat particles which might become impaled on the points of the said roll 23. If desired, as shown in Figure 5 of the drawings, the isolating members 28 and 29 may be duplicated for repeating the separating action described, as for instance, another pair of the said rollers 28 and 29 may be arranged immediately beneath the pair of such members under the hopper 28 and a third pair of the said members may be arranged to operate in conjunction with the meat discharge chute 34 extending off to one side of the machine. The tailings which are delivered from the main part of the separating unit may be delivered onto a slow moving conveyor belt 35 passing along conveniently arranged stations where operators may be placed to pick out any small meat particles that may have escaped separation and delivery into the meat discharge chute 34.

From the foregoing it will be noted that the isolating member or roller 29 presents what may be termed a resilient feeding surface while the isolating member or roller 28 presents what may be termed a toothed receiving surface for impaling the meats and a resilient sub-surface which has the elastic action hereinbefore described. This particular construction has been specially designed so as to avoid injury to the very fragile pecan meats while at the same time catching or impaling the same with certainty so as to effect a complete separation thereof from the shelled particles.

The impaling teeth or spines may be straight or curved but in the arrangement shown in the drawings they are illustrated as being set into the rolls at an angle substantially and preferably tangent to center of the same and pointing preferably in an opposite direction to the movement of the roll in order that both the impaling roll and stripping brush shall have a motion comparatively parallel to the spines to avoid mutilation or injury. Furthermore, another distinctive feature of the device is the elastic or resilient cushion or filling through which the teeth or spines extend from their anchorage to a very short distance of their extremity. This feature is absolutely essential for the elimination of shell particles, since the pressure of the impaling roll presses shell particles as well as meats upon the ends of the spines or against the same, and the shells being too hard to be impaled are forced in between the ends of the spines. The rebound of the elastic body or filling, as above pointed out, forcibly projects the shell particles off of and from between the spines, thereby causing the complete separation herein referred to.

Thus, it will be seen that the separating unit of the apparatus provides for a separation or segregation of the nut meats from an amorphous mass of detached nut meats and nut shells and essentially comprises a receiving surface composed of a series of sharp points or spines moving in a fixed plane or arc, a resilient or elastic sub-receiving surface located below the spined receiving surface and moving therewith, and a resilient or elastic feeding surface moving adjacent the receiving surface, the said surfaces being so correlated as to draw between them, and exert pressure upon, meats and shells presented to them, combined with means for detaching from the receiving surface the meats impaled thereon, and directing the meats and the rejected shell particles to separate exits or receptacles.

From the foregoing it is thought that the essential and distinctive features of the improved process and apparatus will be readily understood without further description and it should also be noted that changes in the form, proportion and minor details of construction with respect to the apparatus may be resorted to without departing from the principle or sacrificing any of the advantages of the invention.

I claim:—

1. A process for extracting and separating nut meats from their shells which consists in causing individual nuts in single file order to be subjected successively and continuously to the action of cracking means for fracturing the shell, then to a shelling instrumentality having jarring and cushioning means for detaching and loosening shell particles from the meats, and to a separate instrumentality for isolating and recovering the meats from the shelled particles.

2. In an apparatus of the class described, a cracking unit having means for cracking nuts singly, a shelling unit receiving the nuts from the cracking unit and having jarring and cushioning means for causing the shell particles to become detached and loosened from the meats, a distributing unit arranged to receive the shells from the shelling unit and having means for rejecting unshelled nuts, and a separating unit arranged to receive the shells from the distributing unit and comprising means for isolating and recovering the nut meats from the shell particles.

3. In an apparatus of the class described, the combination with the cracking and shelling instrumentalities, of a separating unit including members having resilient surfaces arranged to move in spaced relation to draw therebetween the shellings, one of said members having projecting impaling points or spines extending beyond the resilient surface, and a distributing unit superimposed over the separating unit and having means for rejecting unshelled nuts.

4. In an apparatus of the class described, the combination with the cracking and shelling instrumentalities, of a separating unit comprising a pair of meat isolating members arranged to move in unison and in spaced relation, said members being provided with elastic body portions and one of the members being provided with impaling spines or points projecting beyond the surface of the elastic body portion, and a distributing unit superimposed over the separating unit and having means for rejecting unshelled nuts.

5. In an apparatus of the class described, the combination with the cracking and shelling instrumentalities, of a separating unit consisting of a pair of rotating rollers provided with elastic cushion covers and one of said rollers also having impaling points or spines projecting beyond the covering, and a distributing unit superimposed over the separating unit and having means for rejecting unshelled nuts.

6. In an apparatus of the class described, the combination with the cracking and shelling instrumentalities, of a separating unit consisting of a pair of rollers provided with soft rubber coverings and one of the rollers being provided with impaling spines or points projecting beyond the surface of the soft rubber covering thereof, a stripping device cooperating with the spined roller to release the nut meats therefrom, and a distributing unit superimposed over the separating unit and having means for rejecting unshelled nuts.

7. In an apparatus of the class described, the combination with the cracking and shelling instrumentalities, of a separating unit including a meat discharge chute, a tailings conveyor, and a plurality of pairs of rollers, each pair of rollers having elastic cushion coverings and one of the rollers of each pair having projecting impaling spines or points, all of the said spined rollers operating partly within the meat discharge chute, a stripper for each spined roller, and a distributing unit superimposed over the separating unit and having means for rejecting unshelled nuts.

In testimony whereof I hereunto affix my signature.

DICK B. WILLIAMS.